Figure 1:
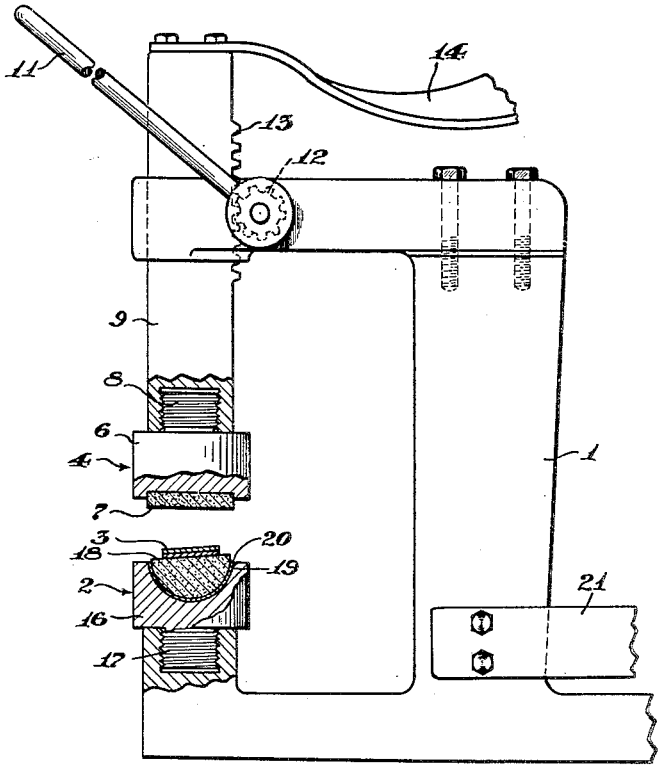

April 4, 1944.　　　　E. I. SHOBERT, 2D　　　　2,346,088
SELF-ALIGNING ELECTRODE
Filed Feb. 5, 1943

WITNESSES.
E. J. Maloney
V. A. Peckham

INVENTOR.
Erle I. Shobert II
BY Brown, Critchlow & Flick
his ATTORNEYS.

Patented Apr. 4, 1944

2,346,088

UNITED STATES PATENT OFFICE 2,346,088

SELF-ALIGNING ELECTRODE

Erle I. Shobert, II, St. Marys, Pa., assignor to Stackpole Carbon Company, St. Marys, Pa., a corporation of Pennsylvania Application February 5, 1943, Serial No. 474,797

6 Claims. (Cl. 219—4)

This invention relates to electrodes for electric resistance welding or brazing machines. Hereinafter, the word "welding" is to be understood as including brazing.

The type of welding machine with which this invention is particularly concerned is one having a pair of vertically spaced electrodes one of which is movable toward the other for engaging opposite sides of the work to hold it between them while electric welding current flows through the electrodes and work. The problems solved by this invention arise chiefly when at least one of the pieces being welded has a width or diameter less or substantially no greater than that of the electrodes so that practically the entire surface of the piece is to be welded. In such a case, where the pieces have relatively large engaging surfaces, it is very difficult to get the current to pass uniformly through them unless those surfaces are perfectly flat. Even then, if the work is not of uniform thickness or if the welding tips are not parallel as they come together, the engaging surfaces of the work pieces will not bear against each other with equal pressure throughout their area. Unequal pressures cause more current to pass through one part of the work than another. The result is uneven heating of the work which may cause one part to become too hot while some other area is not heated enough to form a weld. In such cases it is necessary to release the work and turn it around and then weld it in the new position until welding is completed at all points. Since certain manufacturing tolerances are necessary for all parts, it often is necessary to weld the pieces several times to procure a completely satisfactory weld over a relatively large area. In welding machines that have pivotally mounted electrodes or welding tips, the tips can rock in only one plane and their pivoted mounting causes their work-engaging surfaces to move a material distance laterally for a small amount of pivoting so that they are likely to slide the work pieces on one another or out of position as they seek to align themselves with the work.

It is among the objects of this invention to produce for an electric resistance welding machine a welding electrode which is self-aligning in all directions to produce uniform pressure and welding heat over a large area of the work, which automatically compensates for any tolerances between various work pieces being welded, which does not shift the work pieces when it and the other electrode are pressed against them, and which is of simple and inexpensive construction.

In accordance with this invention, a welding electrode is made in the form of a supporting member or body having a relatively movable work-engaging tip. The welding tip is made in the form of a hemisphere with its flat side positioned to engage the work that is to be welded. The supporting member is provided with a recess that receives the tip. Preferably, this member is part of the bottom electrode of an electric resistance welding machine and is provided in its top with a spherical socket in which the tip is disposed with its flat side up for supporting the work. The tip projects from the socket and, due to its hemispherical shape, is universally movable therein. Due also to the shape of the tip and its ball and socket type of mounting, the center of the flat side of the tip does not change its position when the tip is tilted in the socket, and the edge of that surface does not move horizontally an appreciable amount. Therefore, tilting of the tip to align it with the work or the other electrode does not cause shifting and misaligning of the work pieces. In case the tip is made from graphite and the socket member from copper, electric contact resistance between the two may be decreased by silver plating the wall of the socket. If desired, the tip may be made in a plurality of parts with the work-engaging portion formed from a different material than the rest of the tip and removably mounted thereon for replacement purposes.

Figure 3:
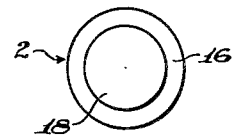
Figure 2:
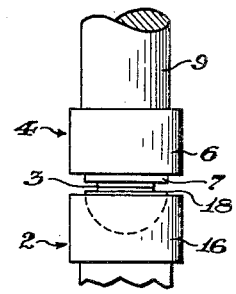
Figure 4:
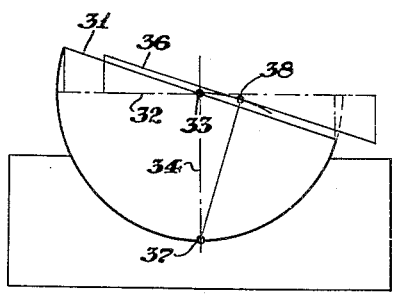
Figure 5:
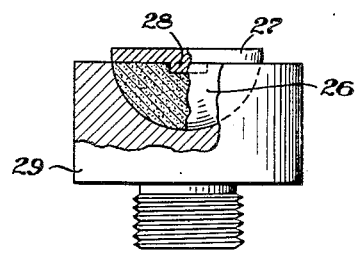

The invention is illustrated in the accompanying drawing in which Fig. 1 is a side view, partly in section, of an electric resistance welding machine equipped with my self-aligning electrode; Fig. 2 is a side view of the two electrodes after they have been brought together in engagement with opposite sides of the work being welded; Fig. 3 is a plan view of the bottom electrode; Fig. 4 is a diagram comparing the action of my electrode with a type known heretofore; and Fig. 5 is an enlarged side view, partly in section, of a modified embodiment.

Referring to the drawing, the welding machine may consist of a yoke-like standard or frame 1 that may be mounted on a bench and that supports a pair of vertically spaced electrodes one of which is movable toward and away from the other. Preferably, the bottom electrode 2 is the stationary one so that the work 3 resting thereon will likewise be stationary while the top electrode 4 is being moved down to engage it. The work may be a pair of small metal plates resting flat upon each other. The top electrode consists of a block 6 of copper or other suitable electrical conducting material having in its lower surface a circular recess in which a cylindrical slug 7 of suitable material, preferably graphite, is mounted. This slug serves as a welding tip that projects from its supporting block to engage the work to be welded. At the upper end of the block there is an integral threaded stem 8 that is screwed into a threaded opening in the lower end of a vertically movable post 9. The post is slidably mounted in the top of the frame and may be raised and lowered in any suitable manner, such as by a lever 11 connected to a gear 12 journaled in a recess in the frame where it meshes with rack teeth 13 on the side of the post. Welding current is supplied to the top electrode in any convenient way, such as through a flexible conductor 14 attached to the top of post 6.

The lower electrode 2 is mounted directly below the upper electrode in the foot of the frame. Like the top electrode, its main body is a metal block 16 of copper or the like having a downwardly projecting threaded stem 17 screwed into the frame. It is a feature of this invention that this electrode is self-aligning so that uniform pressure will be exerted against the work when it is engaged by both electrodes. Accordingly, a welding tip 18 is loosely mounted in the lower metal block for engaging the lower surface of the work and supporting it. To retain the tip and permit it to have universal movement, the top of block 16 is provided with a recess or socket 19 that is in the shape of less than a half of a sphere. The tip itself is a hemisphere that rests in the socket and projects above the block, flat side up. The tip preferably is made of graphite. The electric contact resistance between the welding tip and copper block can be reduced by silver plating the wall of the socket, as indicated at 20 in Fig. 1. Of course, a silver block would be highly satisfactory. Welding current may be supplied to the bottom electrode through a conductor 21 attached to frame 1.

Due to the ball and socket relationship of the lower block and tip, it will be seen that the hemispherical tip is universally movable in the socket. It would not be feasible to try to position the flat top of the lower tip parallel to the flat bottom of the upper tip just before the latter is lowered each time, but this is unimportant because, when the top electrode is moved down to make contact with the work, it pushes down on the high side of the work and thereby raises the low side until the upper surface of the work lies flat against the upper electrode (Fig. 2). The electrodes then bear against the work with uniform pressure over the entire area that is between them. The pressure must be uniform because the hemispherical tip will move in its socket until such a condition is brought about. The result is that electric current applied to the work through the electrodes is distributed uniformly throughout all sections of the work and therefore heats up the work uniformly. The welding is done very quickly since only one weld needs to be made. It will be seen that it is immaterial whether the pieces being welded are of uniform thickness across their widths, because the lower welding tip will compensate for any such inequalities by tipping in its socket.

In some cases it may be desirable to use a different material for the work-engaging surface of the lower welding tip than for the body of that tip. This may be done, as shown in Fig. 5 of the drawing, by making the hemispherical tip in two parts. Thus, the major portion or body 26 of the tip may be made from graphite or carbon and its upper surface made in the form of a thin slug 27 of the desired metal, such as copper, copper-tungsten, tungsten, molybdenum, or any other suitable metal. This slug can be made detachable, such as by providing its lower surface with a central boss 28 that projects down into a cooperating recess in the body of the tip below it. The two-part tip is universally mounted in a spherical socket in a metal body member 29 adapted to be inserted in the frame of the welding machine.

An important advantage of using a hemispherical welding tip is that when it is tilted in its socket either to make its flat top parallel with the upper electrode or to move it out of the horizontal when the work is thicker at one side than the other, the center of the flat top does not move. Because of this, the edge of the flat surface does not move either toward or away from the vertical center line a material amount when the tip is tilted. Therefore, there is no appreciable tendency for the electrode to move the work pieces laterally relative to each other when the electrodes come together and the hemispherical tip is rotated in its socket. This feature is not present with a tip that pivots around a point below its work-engaging surface, because in such a case the center of that surface is swung to one side of the vertical center line, and the edges of the work-engaging surface likewise are moved a material distance toward and away from that line with the result that sliding of the tip against the work pieces or shifting of the pieces relative to each other may be caused.

A comparison of the two conditions is illustrated diagrammatically in Fig. 4 of the drawing in which the upper surface 31 of my lower tip is shown tilted an exaggerated amount from the horizontal, represented by the broken line 32. It will be observed that the center point 33 of the inclined surface has not shifted to either side of the vertical center line 34 of the socket, and that the edges of the upper surface (represented by the ends of line 31) are moved inwardly from their normal position when horizontal only a very slight amount. Superimposed on this drawing in Fig. 4 is a line 36 that represents a surface of the same size as surface 31 and the same distance from the bottom of the socket, but which is mounted to swing around a pivot point 37 at the bottom of the socket. When, as shown, line 36 is swung into a position where it is disposed at the same angle as the line 31, the center 38 of line 36 is spaced a material distance from one side of center line 34, and the ends of line 36 are spaced about the same distance from the points they occupied when the line was horizontal. It will also be noted that whereas both ends of line 31 move either toward or away from the center line, one end of line 36 moves toward the center line when the other end moves away. Thus, the entire line or surface swings laterally across the center line so far that it would be likely to move the work pieces laterally when the electrodes come together.

Expressed in figures, if the distance from point 37 to points 33 and 38 is one inch, and if the angle of lines 31 and 36 from the horizontal line 32 is 2°, point 38 is .035 inch from center line 34 and the ends of line 36 have moved a like distance in a horizontal direction. But the ends of line 31 have moved only .00061 inch, while in every case the center of the line does not move at all. If the angle is 5°, the center and ends of line 36 each move .087 inch as compared with .0038 inch for the ends of line 31. For an angle of 10°, the movement of the center and ends of line 36 is .174 inch as against .015 for line 31. In case of an angle of 15°, the center of line 36 moves .259 inch while its ends move .262 inch, but the ends of line 31 move only .034 inch. This proves that with my hemispherical tip the lateral motion of the flat surface that might otherwise cause displacement of the work pieces is so small as to be negligible.

According to the provisions of the patent statutes, I have explained the principle and operation of my invention and have illustrated and described what I now consider to represent its best embodiment. However, I desire to have it understood that, within the scope of the appended claims the invention may be practiced otherwise than as specifically illustrated and described.

I claim:

1. A self-aligning electrode for an electric resistance welding machine, said electrode comprising a hemispherical tip with its flat side lying in the center plane of a sphere generated by rotation of the tip and adapted to engage the work being welded, and a tip-supporting member provided with a recess receiving said tip, said tip projecting from said member and being universally movable therein without moving the center of said flat side.

2. A self-aligning bottom electrode for an electric resistance welding machine, said electrode comprising a hemispherical tip disposed flat side up for supporting the work being welded, said flat side lying in the center plane of a sphere generated by rotation of said tip, and a tip-supporting member provided in its top with a socket conforming in shape to the adjoining portion of said tip, said tip projecting above said member and being universally movable in said socket without moving the center of said flat side.

3. A self-aligning electrode for an electric resistance welding machine, said electrode comprising a hemispherical graphite tip with its flat side lying in the center plane of a sphere generated by rotation of the tip and adapted to engage the work being welded, and a tip-supporting copper member provided with a recess receiving said tip, said tip projecting from said member and being universally movable therein without moving the center of said flat side.

4. A self-aligning electrode for an electric resistance welding machine, said electrode comprising a hemispherical graphite tip with its flat side lying in the center plane of a sphere generated by rotation of the tip and adapted to engage the work being welded, and a tip-supporting copper member provided with a recess receiving said tip and having a silver-plated wall, said tip projecting from said member and being universally movable therein without moving the center of said flat side.

5. A self-aligning bottom electrode for an electric resistance welding machine, said electrode comprising a multi-part hemispherical tip disposed flat side up for supporting the work being welded, said flat side lying in the center plane of a sphere generated by rotation of said tip, the work-engaging part of said tip being formed from a material different from the part of the tip supporting it, and a tip-supporting member provided with a recess receiving said tip, said tip projecting above said member and being universally movable therein without moving the center of said flat side.

6. A self-aligning bottom electrode for an electric resistance welding machine, said electrode comprising a multi-part hemispherical tip disposed flat side up for supporting the work being welded, said flat side lying in the center plane of a sphere generated by rotation of said tip, the work-engaging part of said tip being metal and the underlying part of the tip being graphite, and a tip-supporting member provided with a recess receiving said tip, said tip projecting above said member and being universally movable therein without moving the center of the said flat side.

ERLE I. SHOBERT, II.